(No Model.)
C. E. TOWER.
PLOW.
No. 442,671. Patented Dec. 16, 1890.
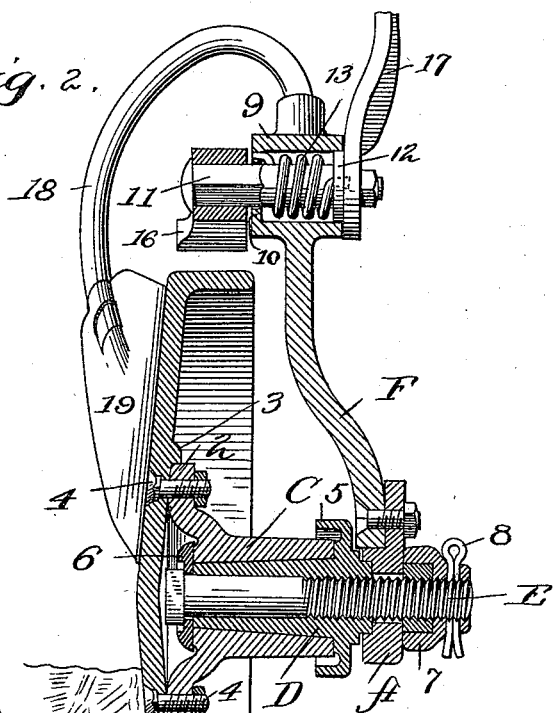
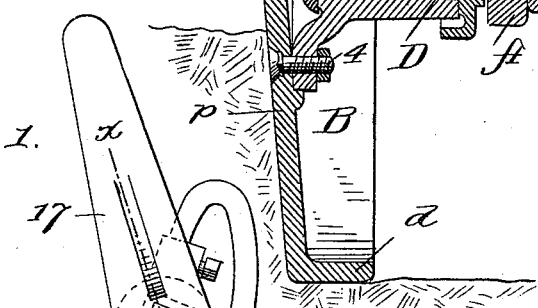
Witnesses
W. P. Keene.
F. L. Middleton.
Inventor
C. E. Tower,
By Ellis Spear
Atty.

UNITED STATES PATENT OFFICE.

CALEB E. TOWER, OF SOUTH BEND, INDIANA, ASSIGNOR TO THE ECONOMIST PLOW COMPANY, OF SAME PLACE.

PLOW.

SPECIFICATION forming part of Letters Patent No. 442,671, dated December 16, 1890.

Application filed April 28, 1890. Serial No. 349,714. (No model.)

*To all whom it may concern:*

Be it known that I, CALEB E. TOWER, of South Bend, in the county of St. Joseph and State of Indiana, have invented a new and useful Improvement in Plows; and I do hereby declare that the following is a full, clear, and exact description of the same.

My invention relates to plows; and it consists of a movable landside, including therewith the supports and bearing, cleaning-scraper, and brake. It is shown in the accompanying drawings, in which—

Figure 1 represents a side elevation of the wheel and its attachments, and Fig. 2 a section on line $x\ x$ of Fig. 1.

In the drawings, A represents a bracket adapted to be connected to the plow-standard by bolts passing through holes 1 1 in this bracket, and forms the entire support for the journal on which the landside-wheel B turns. The wheel is made with the tread $d$ and a face in the shape of a low cone. The face is continuous and clear of all obstructions, and is adapted to bear against the landside and to turn as the plow moves. On its inner face is bolted a hub C. This hub is formed with a downwardly-turned flange 2 and shaped so as to leave a cavity or hollow at the inner end of the hub and within the flange. The flange is adapted to rest within a bead 3, of annular form, concentric with the axis of the wheel on its inner face. The hub is bolted to this inner face by means of bolts 4, having countersunk faces on the outside. The hub is bored out tapering from its outer end inwardly to the wheel, and it is fitted with a sleeve D, which forms the journal for the wheel, this sleeve having a conical taper corresponding with the bore of the hub. This sleeve is provided with a flange having a vertical face adapted to bear against the end of the hub and an overhanging shell 5, of larger diameter than the end of the hub, to exclude grit and prevent undue friction and wear on the hub and bearing. The end of the sleeve outside of the flange is formed with an angular boss (preferably rectangular) fitted to a cavity in the outer face of the bracket A. There is a hole through the bracket in this cavity adapted to receive the bolt E, which passes through it and the sleeve. The head of the bolt is in the cavity of the hub next to the inner face of the wheel, and it bears upon a washer 6, interposed between it and the end of the hub. The bolt is held by means of a nut on its outer threaded end, and over this nut is a cap 7, which is held by a gib 8, whereby the nut is prevented from turning. On the face of the bracket above the sleeve is a recess in which is bolted an arm F. The upper end of this standard is formed with a sleeve arranged horizontally near the plane of the inner face of the wheel. The sleeve is marked 9, and its outer end is provided with a flange 10, which reduces the opening of the sleeve to fit the bolt 11 and to afford a close bearing therefor. The bolt is provided with a collar 12, which fits snugly within the sleeve. A coiled spring 13 surrounds the bolt 11. One end of this spring is fixed in the collar 12 and the other is attached to the sleeve. The other end of the bolt carries the combined scraper and brake. This is made in one piece, the scraper end being shown at 15 and the brake end at 16. The spring holds the scraper end down to its work when left free to act. The scraper is removed from the periphery of the wheel, and the brake is applied thereto by means of the crank-arm 17 on the inner end of the bolt 11, and this arm is connected to the operating-lever of the plow, as in patent granted by the United States Patent Office March 8, 1887, No. 359,190. In the upper end of the arm F is a socket in which is fixed a bent spring-arm 18, the free end of which carries a scraper 19, which bears against the outer face.

The construction of the hub and its connection with the wheel gives a smooth uninterrupted face for the landside, and the bearings are protected from the dirt and grit, and the construction is such that the parts may be easily made, and they are strong and durable. The wheel acts as a supporting-wheel as well as a landside.

The conical face of the wheel serves a very useful purpose, inasmuch as in operation the lower front part presses against the furrowbank, while the back and upper part of the wheel run clear of the bank by reason of its tapering face.

I claim as my invention—

1. In combination with the wheel, the hub C, having the flange 2 bolted to the wheel and a cavity within the flange, a sleeve fitted to the hub, and a bolt within the sleeve, having its head in the cavity and connected to the bracket A, all substantially as described.

2. In combination with the hub of the wheel, having a tapering bore and a cavity between it and the wheel, a sleeve fitted to the bore, having a flange 5, and a bolt provided with a washer 6, located in the cavity, said bolt being connected with the bracket A, substantially as described.

3. The bracket A, combined with the sleeve, the bolt E, and a hub, said bracket being also formed with a recess on its upper edge and further combined with the arm F, substantially as described.

4. The arm F, formed in its upper end with a sleeve, in combination with the bolt 11, the spring 13, the arm 17, and the brake or scraper, substantially as described.

5. An arm F, provided with a socket on its upper end, in combination with the bent spring-arm 18 and the scraper 19, all substantially as described.

6. A landside-wheel having a hub attached to its inner side, the said wheel being formed of a continuous cone-shaped piece forming a front face, said piece being continued inwardly over the hub and forming a tread-flange, substantially as described.

In testimony whereof I have signed my name to this specification in the presence of two subscribing witnesses.

C. E. TOWER.

Witnesses:
J. P. CREED,
LEIGHTON PINE.